April 28, 1931.　　　F. E. NEWTON　　　1,802,668
SELF CENTERING DRIVE SCREW
Filed April 9, 1930
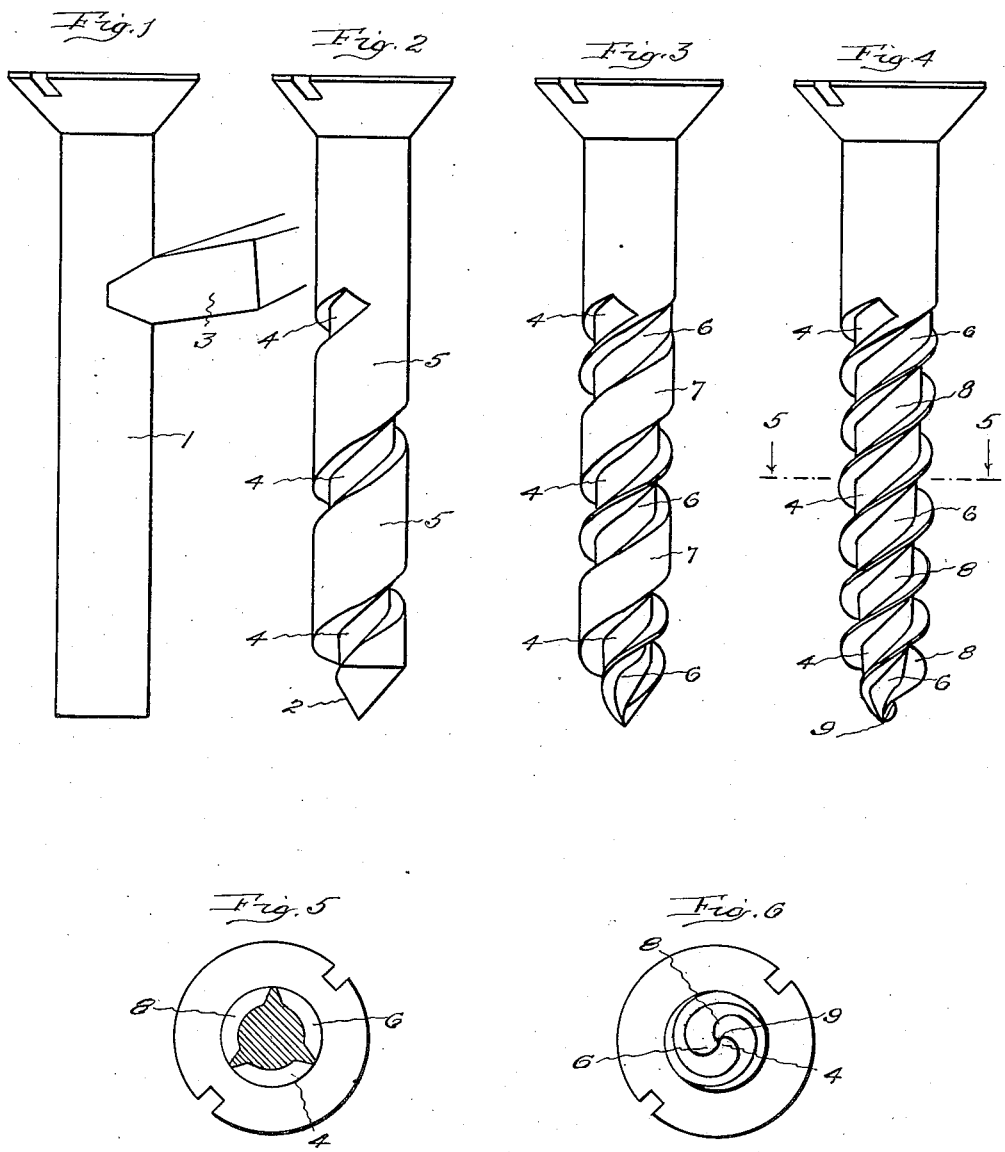

Patented Apr. 28, 1931

1,802,668

UNITED STATES PATENT OFFICE

FRANK E. NEWTON, OF HARTFORD, CONNECTICUT

SELF-CENTERING DRIVE SCREW

Application filed April 9, 1930. Serial No. 442,863.

This invention relates to the type of wood screws which have chased threads on such a pitch that they may be driven into wood by percussion.

The object of the invention is to provide a wood screw of this character which can be made on wood screw machines in common use, and that owing to its form will, without requiring any pre-bored or drilled guiding hole, center itself and enter straight into the wood without liability of becoming bent, or danger of mutilating the fibrous structure of the wood, when driven, and which will advance more rapidly into the wood than, and will have as great holding power as, common wood screws.

Single thread wood screws with chased threads of common shape, crush the fibers of the wood, tend to bend, and are liable to be diverted by the grain of the wood, when driven in by percussion, and if the pitch of the single thread is sufficiently great to permit the screws to be driven, their holding power is greatly reduced. Double thread chased screws may be driven by the application of less percussive force than single thread screws, owing to the increased pitch of their threads, but such screws do not enter without breaking down the fibers of the wood, and they are easily diverted out of line by the grain of the wood as the resistance of the threads is greater on diametrically opposite sides than on the sides that are ninety degrees thereto.

On account of the shape of the tip which results from chasing the threads on diametrically opposite sides of the screw body an exact point cannot be obtained, there is necessarily a line across the tip where the two threads merge, which line obstructs the rotatory movement of the screw and tears the fiber of the wood into which it is driven.

In attaining the object of this invention three threads are chased in the body of a screw blank in such manner that an exact point is obtained from the merging of the threads at the tip, and a screw is produced with threads of a pitch that causes them to so rotate when driven that they may be driven home by percussive blows, and with threads of such a shape adjacent to the point, that they immediately start the rotation of the screw on its axis when driven, and cut their way into the wood. Three threads thus related stiffen the body and center the screw, so dividing the resistance that it will rotate straight into the wood regardless of the tendency of the grain to divert it, and without danger of bending. A screw chased according to this invention has a holding power up to the required standard.

In the accompanying drawings Fig. 1 shows a blank from which a screw embodying this invention may be made. Fig. 2 shows the blank with one groove. Fig. 3 shows the blank with two grooves. Fig. 4 shows the blank with three grooves, or as finished. Fig. 5 shows on same scale a section taken on the plane indicated by the dotted line 5—5 on Fig. 4. Fig. 6 is a view looking toward the point of the finished screw made according to the invention.

In producing screws which embody this invention, headed and slotted blanks 1 are fed in succession into the grasp of the rotating chuck of a wood screw pointing and threading machine of common and well-known type and first given a sharp conical point 2. After being pointed a chasing tool 3 having a cutting tip of the required shape and set at the necessary inclination, is fed to, and along the shank to the point of the rotating blank so as to chase a spiral groove 4 on a pitch which will leave sufficient stock 5 between the coils, as illustrated in Fig. 2, to enable two other similar grooves to be chased parallel thereto. Following the first chasing, the blank having been rotated a number of full turns and one-third or two-thirds more, the chasing tool is again engaged with and fed along the rotating blank to the point so as to cut the second groove 6 leaving enough stock 7 between the grooves thus cut, as illustrated in Fig. 3, to permit of a third groove being cut. Following this the blank having been rotated a full number of turns and one-third or two-thirds more, according to the conditions under which the second groove was made, the chasing tool is again brought into action and the third groove 8 is chased to the point 9, Fig. 4. To form the threads to the required depth the chasing tool is engaged with the blank a number of times for cutting each groove, the tool making a cut for each groove in succession at the same depth and starting at the same distance from the head, but one hundred and twenty degrees apart, then repeating this at increasing depths until the threads are completed.

As a result of pointing the blank and cutting three grooves in the manner described so that they will merge at the point, the extreme tip of the screw is very sharp, and immediately above this point three threads start from nothing and increase from fine lines one hundred and twenty degrees apart to full size. As viewed from another standpoint the improved self-centering drive screw has a headed body with threads starting 120° apart at the same distance from the head, and these threads extend all the way to and terminate at the point. The threads are of the same pitch throughout their length and adjacent the point they converge and diminish in height, so that the tops and roots of all the threads intersect and vanish into a common point at the tip which lies in the longitudinal axis of the screw. This permits the screw to easily enter wood when driven by the blow of a hammer.

Not only does the fine sharp point permit the screw to be driven into wood but the pitch of the three threads one hundred and twenty degrees apart is sufficiently sharp to cause the screw to rotate as it is driven so that it is unnecessary to bore or drill a guiding hole. The threads thus made divide the resistance, as a three bearing, so that the screw does not bend nor is it diverted from the desired direction by the grain of the wood, thus obviating cracking or splitting the piece into which it is driven. It has been demonstrated by actual use that the holding power of this screw, owing to the fact that it rotates and cuts its way in when hit a blow, is equal to or greater than that of the common single thread wood screw of the same size.

The invention claimed is:

A self-centering screw having a headed body with threads starting one hundred and twenty degrees apart at the same distance from the head and terminating at the point of the screw, said threads having the same pitch throughout their length and adjacent to the point converging and diminishing in height so that the tops and roots of all the threads intersect and vanish into a common point at the tip in the longitudinal axis of the screw.

FRANK E. NEWTON.